Figure 3:
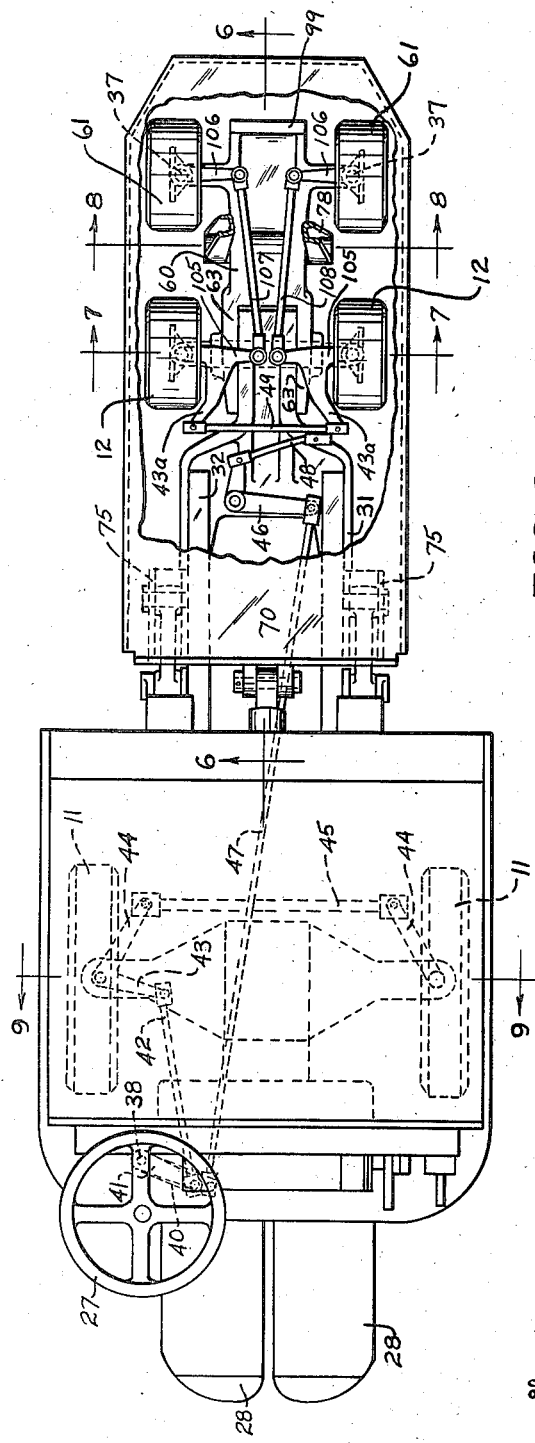

April 30, 1935. A. R. GOLRICK 1,999,188
INDUSTRIAL TRUCK
Filed Nov. 9, 1931 4 Sheets-Sheet 1
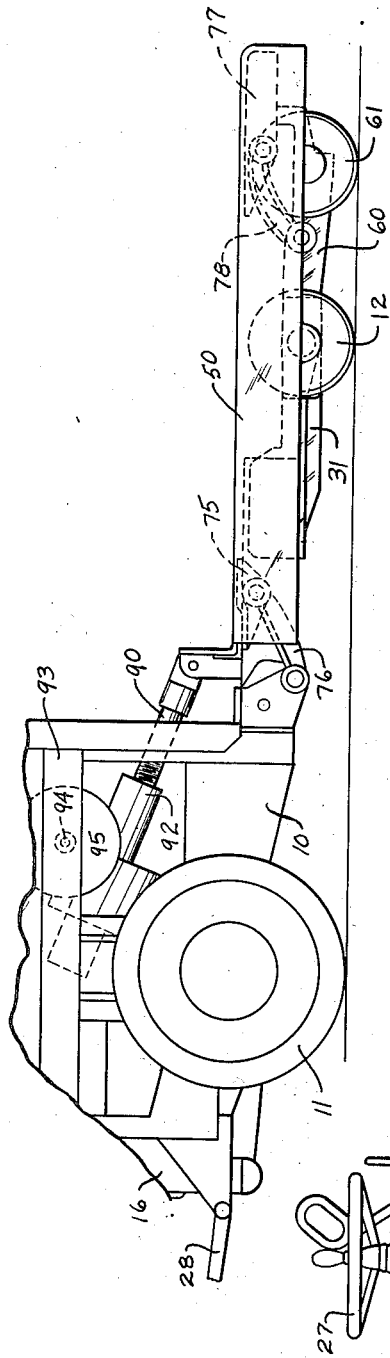
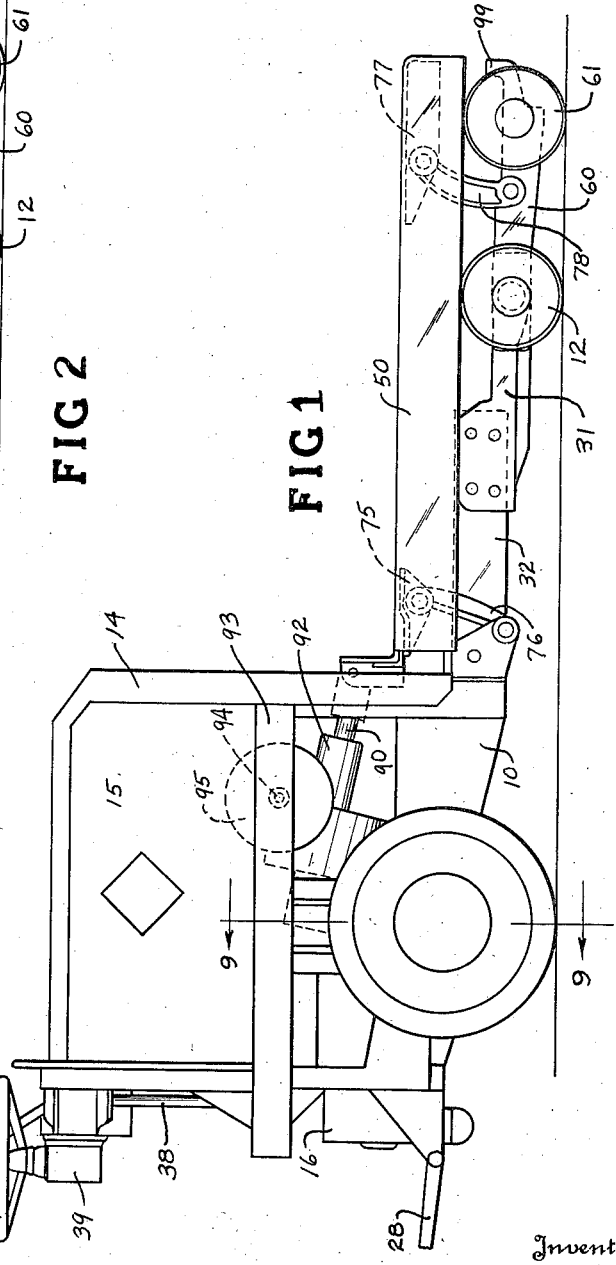
Inventor
Albert R. Golrick
By Bates, Golrick & Teare
Attorneys April 30, 1935.  A. R. GOLRICK  1,999,188
INDUSTRIAL TRUCK
Filed Nov. 9, 1931  4 Sheets-Sheet 2

Inventor
Albert R. Golrick
By Bates, Golrick & Teare
Attorneys

April 30, 1935.  A. R. GOLRICK  1,999,188
INDUSTRIAL TRUCK
Filed Nov. 9, 1931  4 Sheets-Sheet 3
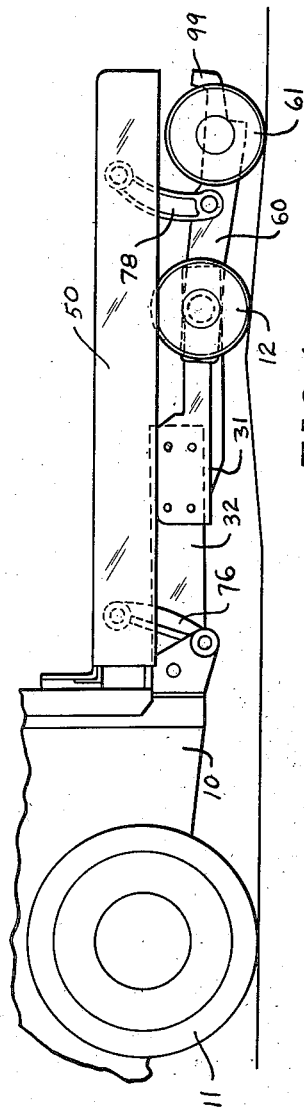
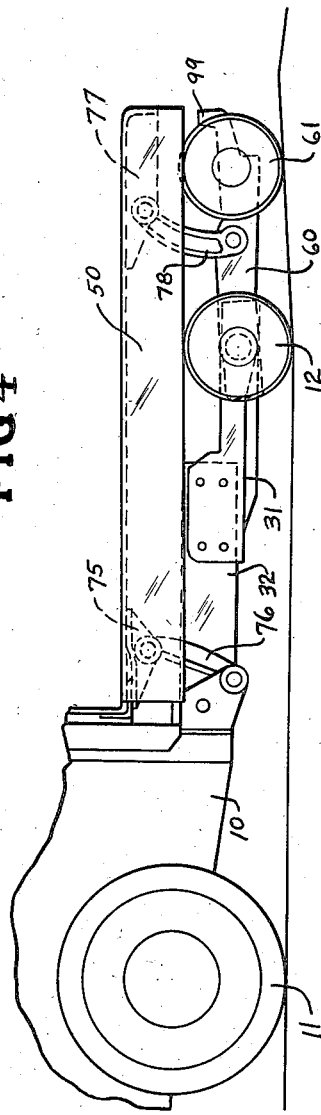
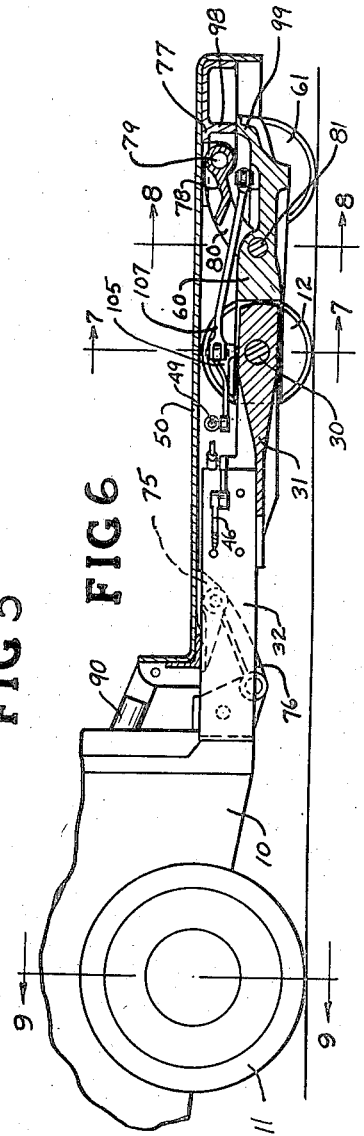
Inventor
Albert R. Golrick
By Bates, Golrick & Teare
Attorneys April 30, 1935.  A. R. GOLRICK  1,999,188
INDUSTRIAL TRUCK
Filed Nov. 9, 1931   4 Sheets-Sheet 4

Inventor
Albert R. Golrick
By Bates, Golrick & Teare
Attorneys

Patented Apr. 30, 1935

1,999,188

UNITED STATES PATENT OFFICE 1,999,188

INDUSTRIAL TRUCK

Albert R. Golrick, Shaker Heights, Ohio, assignor to Sheldon K. Towson, Cleveland Heights, Ohio Application November 9, 1931, Serial No. 573,902

9 Claims. (Cl. 180—23)

This invention relates to improvements in industrial trucks, and especially to trucks which are arranged to transport comparatively heavy loads. The embodiment shown in the drawings is a truck of the elevating platform type, such as is commonly used for the transportation of materials from place to place, in and about industrial establishments.

The general object of the invention is the provision of an industrial truck, capable of handling loads of varying weights, in such a manner that the load will be distributed over a plurality of load-bearing wheels. A more specific object is to provide an industrial truck with a load-lifting and supporting member and so support the load-lifting member that, when it is in its elevating position, the load may be transported from place to place over uneven truck supporting surfaces without setting up undue twisting strains in the truck chassis, and without undue wear upon the load-bearing wheels or axle members.

A further object is to provide an industrial truck with a plurality of load-bearing wheels spaced to lie beneath a load-engaging platform, and to provide a platform support including a load-bearing wheel mounting so arranged that the overall height of the platform may be retained at a minimum, and wherein the wheel mounting is so constructed as to transmit the greater part of the load directly to the truck-supporting surface and thereby relieve the main frame and prevent undue twisting of the truck parts.

Another object of this invention is to provide an industrial truck with an articulated frame member arranged to support part of the load, and wherein such articulated frame and the main frame are so constructed that the relative movement between them may be readily limited without danger of distorting or breaking the various parts.

Other objects of this invention will become apparent from the following description, reference being had to a preferred embodiment thereof, illustrated in the accompanying drawings. The essential and novel features of the invention will be set forth in the claims.

Figure 7:
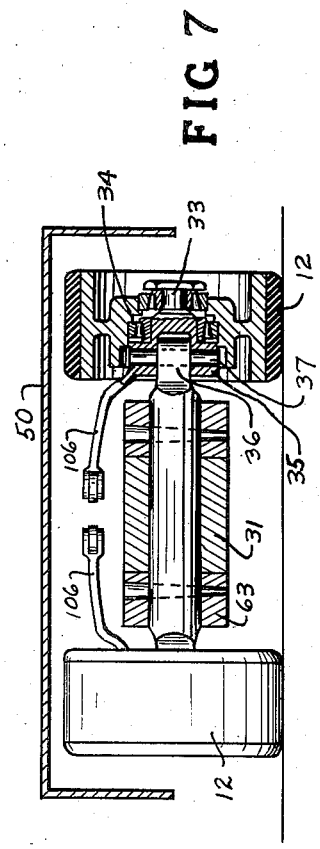
Figure 8:
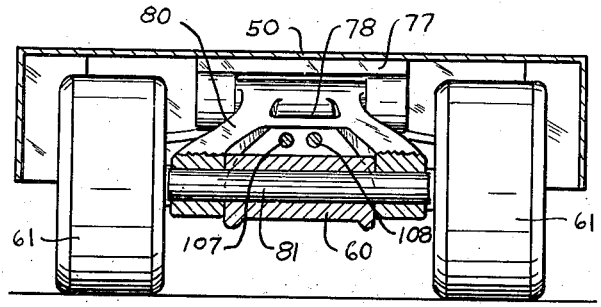
Figure 10:
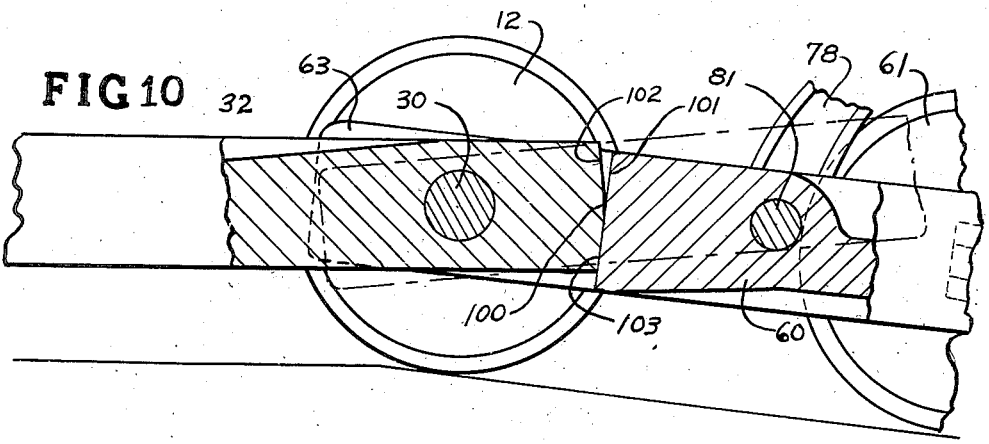
Figure 9:
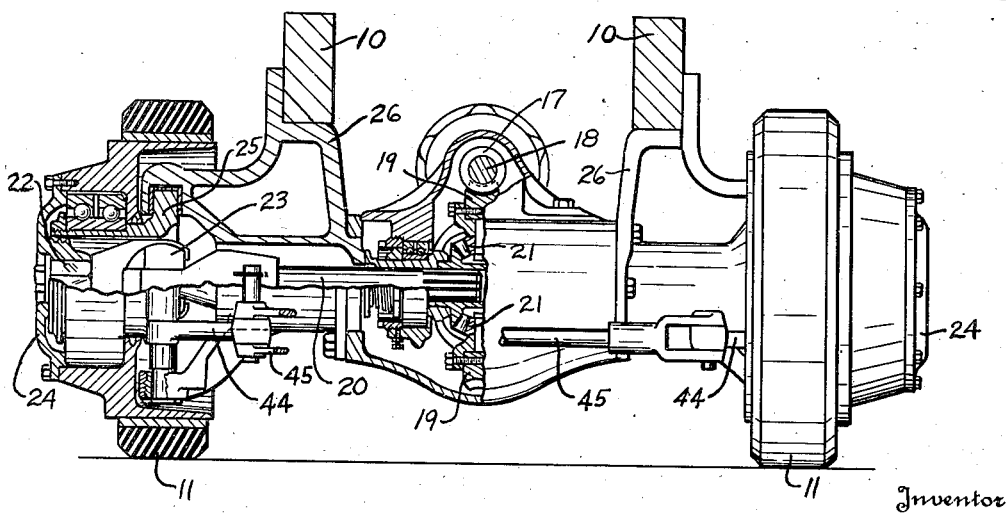

In the drawings, Fig. 1 is a side elevation of an industrial truck, having a lift platform and embodying my invention; Fig. 2 is a fragmentary side elevation of the truck, illustrated in Fig. 1, showing the lift platform in a different position; Fig. 3 is a plan view of the truck having a portion of the elevated platform broken away to more clearly illustrate the wheel mounting and chassis construction; Figs. 4 and 5 are fragmentary side elevations, illustrating the articulated chassis and wheel mounting in various positions, which are the result of uneven truck supporting surfaces; Fig. 6 is a centrally located longitudinal section, as indicated by the lines 6—6 on Fig. 3; Figs. 7, 8, are transverse vertical sections through the wheel mounting and chassis and are indicated by the lines 7—7 and 8—8 respectively, on Figs. 3 and 6; Fig. 9 is a sectional detail through the driving wheel and axle, as indicated by the lines 9—9 on Fig. 3; Fig. 10 is an enlarged sectional detail, illustrating the preferred method of limiting the movement of the articulating frame member.

Referring again to the drawings, I have illustrated the preferred form of my invention embodied in an industrial truck, designed for transporting comparatively heavy loads. As shown, the truck comprises a main chassis or frame 10, having mounted thereon, at its forward end, a pair of driving wheels 11, and at its rear, a pair of relatively small load-bearing wheels 12. All of the wheels in the embodiment illustrated are dirigibly arranged so as to turn about individual axes, thereby permitting the truck to turn about a small turning radius.

Standing upwardly on the forward end of the truck chassis is a frame structure, generally indicated at 14, and which comprises a suitable support for a battery and motor, or other power supply and certain of the operating controls. In the embodiment illustrated, a housing 15, mounted on the upper portion of the frame work 14, encloses a suitable battery, and disposed beneath the housing 15 is a motor 16, having suitable driving connections to the driving wheels 11.

The driving connection for the wheels 11, is arranged to permit the wheels to turn about individual vertical axes. This driving connection is best shown in Fig. 9, and comprises a worm 17, mounted on the motor shaft 18 and meshing with a worm gear 19, the latter serving to drive a shaft 20 through the medium of differential gearing 21. The shaft 20 is connected to the wheel spindles 22, through the medium of universal joints 23, one of which is shown in Fig. 9. Each spindle 22 is in turn drivingly connected to its respective wheel 12 by a closure plate 24, which is attached to the end of the spindle 22 and to the hub of the wheel 11. Each wheel 11 is rotatably carried on a hollow sleeve 25, to which the suitable steering arms 43, hereinafter described, are rigidly attached. The sleeves 25 are pivotally carried on the gear and shaft housing 26, the latter being secured to the chassis frame 14.

The various operating controls include a steering wheel 27 and pivoted platforms 28, which extend forwardly from the truck frame 14. The arrangement of these controls is such that the operator, when standing upon the platform members 28, may readily control the progress of the truck from place to place, as well as operate the elevating platform or load supporting surface.

The rear or load carrying wheels 12 are mounted on an axle 30, which is rotatably journalled in a frame extension member 31. This frame extension 31 is rigidly secured to and extends rearwardly from a pair of sill members 32, which form part of the main frame 10. The construction of the chassis extension is such that it is comparatively narrow at its rearmost portion or at that end farthest away from the sill to thereby permit the dirigible wheels 12 to lie adjacent the center of the truck and not extend beyond the confines of the load supporting member or platform 50. As shown, the frame 31 is made with as minimum a depth as is consistent with strength and rigidity of structure.

The load bearing wheels 12 are dirigibly mounted to enable the turning of the truck in a comparatively narrow passageway. To this end the wheel 12 is rotatably journalled on a spindle 33. As shown in Fig. 7 suitable anti-friction bearings 34 are interposed between the wheels and the spindle. The rearmost end of the spindle is yoked as at 35, and arranged to embrace a flattened end 36 of the axle 30, heretofore described. A suitable pin, such as shown at 37, passes freely through the yoke 35 and the end 36 of the spindle, and is secured to the axle 30, thereby providing a vertical axis about which the wheel may be turned.

To enable the operator of the truck to turn the truck at will, the steering wheel 27 is connected by suitable linking mechanism to the wheels 11 and 12. As shown, the steering wheel 27 is connected to a vertically extending shaft 38 by suitable gearing, not shown, but contained within a housing 39. A pair of levers 40 and 41 are secured to the lowermost end of the shaft 38, and are connected by suitable linkage to respective pairs of wheels 11 and 12. As shown the lever 40 is connected by a link 42, with steering arm 43, of one front wheel 11. This arm 43 is provided with a second arm 44, arranged to be connected to a similar arm 44 of the other wheel 11, by a suitable link 45. The lever 41 of the shaft 38 is connected to a bell crank 46, by a link 47. The bell crank 46 is secured to the chassis frame 10, and is, in turn, connected by a link 48 to a transversely extending link 49. The link 49 is connected at its opposite end to the steering arm 43a, which is integrally formed on the spindles 33 of the rear wheels 12, thereby joining these wheels to the steering wheel 27 for steering purposes.

The construction so far described is generally typical of industrial trucks of the low-lift platform type. In the past, the load supporting and lifting member was generally mounted or carried by the frame 10, the sill members 32, or the frame extension 31. In such instances, the rear wheel 12 supported the greater part of the load. The size of this wheel was limited by the restricted height of the platform or load supporting member, and it was desirable that this platform or load supporting member be normally positioned a minimum distance from the truck supporting surface to enable it to be inserted beneath loads which were comparatively close to the truck supporting surface, such as low skids. Therefore, when the load was increased, one method of providing a supporting structure therefor was to increase the diameter of the wheels, and the relative sizes of the wheel supporting members, but to do this raised the height of the platform, as the wheels lay beneath the latter so that loads of various widths could be retained thereon without interference with the wheels. Another type of construction provided a plurality of pairs of load bearing wheels. This permitted the wheels to be maintained of the same size. However, when a plurality of pairs of wheels were used and the truck driven over uneven truck supporting surfaces, it was found that the entire load was, at times, carried by either one or the other pair of wheels. Hence, the chassis was still subjected to the strain of the entire load.

The next advancement in trucks of this type was to mount both pairs of load bearing wheels on a sub-frame member, which was, in turn, pivotally secured to, and swung beneath the main frame. This construction also had its disadvantages, such as the supporting of the entire load by the pivot between the main frame and the sub-frame. This required a very sturdy construction of main frame and sub-frame and often required the platform to be raised. One way of avoiding the raising of the platform, when a sub-frame was used, was to mount the sub-frame in the same horizontal plane as the chassis itself. However, this often required a widening of the truck structure and its resultant increase in width of platform. These trucks are designed so that the platform may be projected beneath a load, which is supported comparatively close to the truck supporting surface on suitable blocks or skids. Hence, the increase in width of the platform, limited the minimum width of load which could be readily handled by the truck. It is therefore apparent that constructions which would involve the widening or raising of the platform are highly undesirable.

From the foregoing, it is evident that the requirement of constructing a main frame which compensates for the strains of supporting the entire load, is practically eliminated by a construction wherein the load bearing platform transmits part of the load direct to the main frame and part of the load direct to an auxiliary frame. My invention comprises an improvement in a structure of this type. In general, my improved structure comprises an articulated frame member which is pivotally secured to and extending rearwardly from the main frame member, and to which the platform is directly secured. The advantages of such construction will be readily apparent from a detailed description which follows.

In my improved construction, I provide a trailing frame member 60 which is pivotally secured to the main frame 10, and which is provided with a pair of load bearing wheels 61. The arrangement is such that the wheels of the trailing frame supplement the load bearing wheels 12, heretofore described. In addition, I provide the platform 50 with pivoted connections to the trailing frame member and the main frame. I also provide the main frame with a fixed pivotal connection to the trailing frame, and so arrange the platform 50 that it will not interfere with relative movement between the articulated frame member 60 and the main frame member 31. As shown in the drawings, I provide a trailing frame 60 which is arranged to extend rearwardly from the frame structure 32 and in substantially the same horizontal plane. Such construction I find does not increase the size of the load bearing wheels 12, or the increase of the width or height of the platform or load supporting surface 50.

The load which is applied to the trailing frame 60 is transmitted by such frame directly to the load bearing wheels 12, and a second pair of load bearing wheels 61, rotatably mounted adjacent the rear end of the trailing frame, as will be hereinafter described. Such a construction does not require undue strengthening of the connection between the trailing frame and the main frame. Likewise, this construction shortens the length of the main frame proper, as the overall length of the truck is maintained constant. Hence, such construction has many apparent advantages, one of which is such that the main frame need not be so heavily constructed as when it is extended to the rearmost parts of the truck or even when extended to a point midway between the two pairs of wheels 12 and 51, as in the case of most sub-frame assemblies.

As shown in the drawings, and especially in Figs. 3 and 7, the forward end of the trailing frame 60 is forked, the forked end 63 thereof embracing the sides of the narrow or rearmost ends of the frame extension member 31. The axle 30, heretofore described, passes through the forked ends of the trailing frame as well as through the main frame extension 31. In the present embodiment, for reasons hereinafter to be explained in detail, I have rigidly secured the trailing frame 60 to the axle 30, so that they will rock as a unit. However, this is not essential.

The trailing frame 60 is connected to the main frame 10 in such a manner that it is maintained in longitudinal alignment therewith. As shown in Fig. 3, the forked extensions 63, of the trailing frame 60, extend some distance forward of the axle 30 and embracingly contact with the sides of the frame extension member 31. Hence, while the pivotal connection between the main frame 10 and the trailing frame 60 permits relative movement in a vertical plane between such frames, the forked extensions 63 of the trailing frame 60 act directly on the main frame and prevent relative movement between the two frame members in a horizontal plane, thereby relieving the axle 30 of such strains.

The trailing frame 60 is preferably secured directly to the axle 30 and causes the load, carried by the trailing frame, to be transmitted directly to the load bearing wheels 12, without the intermediacy of the main frame. Hence, the pivotal connection between the main frame and the trailing frame need only be of sufficient strength to cause the latter to follow the main frame during the movement of the truck. Likewise, the main frame may be comparatively narrow, and of a minimum thickness to enable the overall width of the main frame and the forked ends of the trailing frame to be maintained minimum width, thereby keeping the width of the platform member 50 at a minimum, and enabling comparatively narrow loads to be readily handled by the truck.

Part of the load carried by the trailing frame is transmitted directly to the pair of wheels 61 heretofore mentioned. These wheels are substantially the same as the wheels 12 and hence will not be described in detail. Suffice it to say that the pivot pin 37 of these wheels is secured to a flattened extension 66 of the frame 60, and serves to pivotally connect the wheels 61 to the trailing frame 60 in the same manner as the pins 37 connect the wheels 12 to the axle 30. The extensions 66 are preferably formed integral with the trailing frame 60, projecting outwardly therefrom in opposite directions, as shown in Fig. 3.

The load engaging and supporting platform 50 may be of any suitable construction, as shown in the drawings it comprises a substantially rectilinear member flanged downwardly at its edges and provided with a flat central load supporting surface 70, which entirely overlies the frame extension 31, the articulated or trailing frame 60, as well as the load bearing wheels 12 and 61. On its underside, near its forward end, the end adjacent the battery housing 15, the platform is provided with a pair of downwardly extending brackets 75, which are connected to the main frame by a pair of spaced links 76, pivoted at their opposite ends to the brackets 75, and to the sills 32 of the main frame 10. Adjacent its rearmost end, the platform 50 is provided, on its underside, with a bracket member 77, which is pivotally connected by a link member 78 to the trailing frame 60. As shown, the upper end of the link 78 is pivotally mounted on a pin 79 carried by the bracket 77, while the lower end of the link is forked, as at 80. The fork-like portions 80 of the link and embrace the sides of the trailing frame 60, are pivotally connected thereto by a suitable shaft or pivot pin 81. This pin lies somewhat closer the rear pair of wheels 61 than the forward load bearing wheels 12. Hence, the greater part of the load transmitted from the platform through this link to the trailing frame is carried through such frame to the rearmost wheels 61, while the lesser part of the load is carried forwardly to the load bearing wheels 12. This, to some extent, equalizes the load upon the two pairs of wheels 12 and 61, as the forward wheels 12 carry part of the load of the platform and part of the weight of the truck frame 10.

A suitable power mechanism for swinging the platform 50 to raise it after it has been inserted beneath the load, and to lower the same to deposit a load, may comprise a ram bar 90, mounted in a housing 92, which is pivoted to a frame member 93 of the main frame 14, as at 94. A motor 95 in suitable gearings (not shown) but contained within the housing 92 acts to draw the ram bar 90 inwardly to raise the platform from the position shown in Fig. 2 to the position shown in Fig. 1, or to force the ram bar outwardly to lower the platform to the position shown in Fig. 2.

It will be seen from the foregoing description that when the platform is raised and the trailing frame is in a normal position, the links 75 and 78 are substantially parallel. When the platform is in its lowered position the forward end rests upon the sill members 32, and at its rear end a boss 98 of the bracket 77, contacts with a rearwardly extending lug or ear 99 of the trailing frame member 60, thereby permitting the platform to rest upon the main frame and trailing frame.

When the platform 50 is in its raised position, it is supported entirely by the links 76 and 78, and the ram 90 acts to retain it in such position. It will be noted that the construction of the platform support is such that the platform is free to move as the trailing frame pivots relative to the main frame due to any uneven truck supporting surface, as all connections between the platform and the main frame or the trailing frame of the truck are pivotal.

It is desirable to provide some means to restrict or limit the movement of the trailing frame to prevent tipping of the load. It is desirable to provide a limit or stop mechanism which eliminates the use of lugs or similar protuberances projecting from either one frame or the other, and which are apt to be sheared therefrom, due to the comparatively heavy load which the truck is designed to handle. I therefore prefer to limit the movement of the trailing frame 60 relative to the main frame member 32 by the contact of substantially vertical surfaces, thereby causing the shearing stresses to act through substantially horizontal parts of the frame members. In this manner the shear is absorbed by parts of the main frame and the trailing frame, which are constructed to withstand the strains resulting from the moving of the truck from place to place, and which therefore will require no additional strengthening with its attendant result of enlargement of parts. As shown in the drawings, and especially in Figs. 6 and 10, the supplemental frame 32 extends some little distance beyond the axle 30 and is provided with a substantially vertical surface 100 which lies adjacent a normally vertical surface 101 formed on the forward face of the trailing frame member 60 between the two forked extensions 63. The surface 100 of the frame extension is spaced a slight distance from the surface 101 and is bevelled and inclined slightly from a horizontal plane passing through the axle 30, the upper portion of the surface 100 being inclined upwardly and forwardly as 102 while the lower surface is inclined downwardly and forwardly, as at 103. The arrangement of the surfaces 102 and 103 is such that when the trailing frame swings about the axis 30, the normally vertical surface or face 101 of the trailing frame 60 will contact with one of the bevelled surfaces 102 or 103 of the face 100 of the frame extension 32. The angle of the bevel of the faces 102 and 103 is such that they provide a face to face contact with the face 101 of the trailing frame 60 when the latter is in its uppermost or lowermost positions, respectively.

This construction provides a surface contact of two pieces of metal having considerable area bulk and strength and transmits the strain due to the limiting of the movement of one part relative to the other through substantially horizontal planes and through axes which are strengthened for other purposes, such as carrying the load, etc., and does not require any undue strengthening of the parts nor does it require adding to the height of, either the main frame or the trailing frame, as does the provision of ears or other protections which would engage either the top or bottom surfaces of one of the other frame members, as is the usual practice in such cases.

The load bearing wheels 61, heretofore explained, are dirigibly mounted. The turning movement of these wheels is controlled from the steering wheel 27 through the linkage which controls the turning movement of the wheels 12 and heretofore described. As shown in Fig. 3, each of the spindles 33 of the wheels 12 is provided with an inwardly extending arm 105, which are pivotally connected to similar arms 106 of the rear wheels 61 by suitable links 107 and 108. The links 107 and 108 lie over the frame 60, passing through a recess 109 formed by the forked ends of the link 79, and serve to connect the arms on respective sides of the truck frame. It will be noted in connection with the steering arrangement for the rear wheels that the steering arms for both wheels 12 and 61 swing with the movement of the trailing frame. This is due to the fact that the trailing frame is pinned or rigidly secured to the axle member 30. Hence, the links 107 and 108 are provided with simple pivotal connections, whereas the balance of the steering mechanism is provided with the usual type of spring pressed ball and socket members. This materially reduces the cost of the steering mechanism of the truck.

From the above description it will be seen that I have provided an industrial truck of the low lift platform type, a plurality of pairs of comparatively small load bearing wheels suitably arranged and mounted to maintain the height and width of the platform at a minimum. It will also be seen that I have provided an industrial truck with a platform disposed over a low swung portion of the frame, wherein the platform may be lowered to receive a load and thereafter raise and transport the load, and wherein there is a pivotal connection between the wheel mounting and the chassis and platform, which permits the wheel mounting to rock relative to the chassis and platform, and wherein the truck is provided with a trailing or rearwardly extending frame which supports the rearmost pair of load bearing wheels and have positioned the various parts to carry their respective loads with a minimum amount of distortion and twisting of various frame members, thereby materially decreasing the size of such members and the bulkiness of the load supporting structure as a whole.

I claim:

1. In a truck, the combination of a main frame having a pair of driving wheels at its forward end and a pair of load supporting wheels at its rearmost end, a trailing frame member pivoted to the main frame adjacent its rearmost end and extending rearwardly therefrom, a pair of load bearing wheels mounted on the trailing frame adjacent its rearmost end, a load supporting member pivotally connected at one end to the main frame, and a load transmitting member connecting the other end of the load supporting member directly with the trailing frame.

2. In a truck, the combination of a main frame having supporting wheels mounted thereon, a trailing frame member extending rearwardly from and having one end thereof pivotally connected to the main frame, said trailing frame having forwardly extending means coacting with the main frame to maintain the two frames in alignment, a pair of load bearing wheels mounted on the trailing frame adjacent the rearmost end thereof, and load engaging member having connections with the main frame and the trailing frame member, wherein said connections include means to permit a relative swinging movement between the two frame members.

3. In a truck, the combination of a main frame having a pair of driving wheels mounted at one end and a pair of load bearing wheels mounted on its opposite end, a trailing frame member extending rearwardly from and having one end thereof pivotally connected to the main frame, said trailing frame having forwardly extending means coacting with the main frame to maintain the two frames in alignment relative to a substantially vertical plane, a pair of load bearing wheels mounted on the frame extension adjacent the rearmost end thereof, and a load engaging member pivotally connected at one end to the main frame and pivotally connected at its opposite end to the trailing frame member.

4. In an industrial truck having an upright frame portion and a low slung frame portion extending rearwardly from the upright portion adjacent the ground, driving wheels mounted on the truck frame adjacent the upright end thereof, a pair of relatively small wheels to support the low slung portion of the truck frame, an elevatable platform overhanging the low slung portion of the truck frame, said platform being attached to the truck frame at the inner end thereof by a link member, an auxiliary frame extending rearwardly from the main frame and to which a second pair of small wheels are attached, a link member connecting the platform to the auxiliary frame, and means pivotally connecting one end of the auxiliary frame to the low slung portion of the truck frame.

5. In an industrial truck having an upright frame portion and a low slung frame portion extending rearwardly from the upright portion adjacent the ground, driving wheels mounted on the truck frame adjacent the upright end thereof, there being a pair of relatively small wheels secured to the low slung portion of the truck frame, an elevating platform overhanging the low slung portion of the truck frame, said platform being attached to the truck frame at the inner end thereof by link members, a trailing frame extension member extending rearwardly from the main frame, a pair of small wheels attached to the frame extension, a link connecting the platform to the frame extension intermediate the last named pair of wheels and the main frame, and means pivotally connecting one end of the frame extension member to the rear end of the low slung portion of the truck frame.

6. In an industrial truck, the combination of a main frame, a pair of driving wheels mounted near the forward end of said frame, a pair of load bearing wheels mounted near the rear end of said frame, a trailing auxiliary frame pivoted to and extending rearwardly from said main frame, the axis of said pivot coincident with the axis of said load bearing wheels, a pair of load bearing wheels mounted on the auxiliary frame, an elevating platform overhanging both of said frames and wheels, and means pivotally connecting said auxiliary trailing frame with the overhanging platform at a point to the rear of the rearmost extremity of the main frame.

7. In an industrial truck, the combination of a main frame, a pair of driving wheels mounted on said frame, near the forward end thereof, a pair of load bearing wheels mounted on said frame near the rear end thereof, a trailing frame member pivotally connected to the rear of said main frame and extending rearwardly therefrom, a pair of load bearing wheels mounted on said pivoted trailing frame, an elevating platform overhanging both of said frames, and pivotal means connecting said pivoted trailing frame with the overhanging platform, whereby there may be relative movement between the platform, the pivoted trailing frame and the main frame.

8. In an industrial truck, a main frame, a pair of driving wheels mounted adjacent the forward end of the frame, a pair of load bearing wheels mounted on the main frame adjacent its rearmost end, a rearwardly extending trailing frame member, a pivotal connection between said trailing frame member and the rear end of said main frame, a pair of dirigible load bearing wheels carried by the rearwardly extending frame member, a load bearing platform, means connecting the platform with the main frame, forked means connecting the platform to the frame extension, a manually operable steering device carried by the main frame adjacent its forward end, link mechanism extending from said steering device to said dirigible wheels, and wherein said linkage lies between the platform and said frame members and passes through said forked means.

9. In an industrial truck, a main frame, a pair of dirigible driving wheels mounted on said frame adjacent its forward end, a pair of dirigible load bearing wheels mounted on said frame adjacent its rearward end, an axle member rotatably carried by said frame and on which said last named wheels are pivotally mounted, steering arms connected to said wheels, a trailing frame member secured to said axle and extending rearwardly from the main frame, a pair of dirigible load bearing wheels mounted on said trailing frame, steering arms connected to said last named wheels, linkage connecting the first named steering arms with the second named steering arms whereby all of said arms and the trailing frame rock as a unit about said axle, a manually operable steering device mounted on the main frame, and linkage connecting said steering device with the first named linkage to steer the truck.

ALBERT R. GOLRICK.